(12) United States Patent
Kloeppner et al.

(10) Patent No.: US 7,001,540 B2
(45) Date of Patent: *Feb. 21, 2006

(54) ELECTROCHROMIC MEDIUM HAVING A SELF-HEALING CROSS-LINKED POLYMER GEL AND ASSOCIATED ELECTROCHROMIC DEVICE

(75) Inventors: Leroy J. Kloeppner, Jenison, MI (US); Thomas F. Guarr, Holland, MI (US); Kevin L. Ash, Grand Rapids, MI (US); Kathy E. Roberts, East Grand Rapids, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/662,665

(22) Filed: Sep. 15, 2003

(65) Prior Publication Data

US 2004/0061097 A1    Apr. 1, 2004

Related U.S. Application Data

(63) Continuation of application No. 09/940,944, filed on Aug. 28, 2001, now Pat. No. 6,635,194.

(51) Int. Cl.
*G02F 1/153*    (2006.01)
*G02F 1/00*    (2006.01)

(52) U.S. Cl. ............... 252/583; 252/586; 359/265; 359/267; 359/272; 359/273; 359/275

(58) Field of Classification Search ............... 252/583, 252/586; 359/265, 267, 272, 273, 275
See application file for complete search history.

(56) References Cited

U.S. PATENT DOCUMENTS

| | | |
|---|---|---|
| 5,679,283 A | 10/1997 | Tonar et al. |
| 5,910,854 A | 6/1999 | Varaprasad et al. |
| 5,928,572 A | 7/1999 | Tonar et al. |
| 5,940,201 A | 8/1999 | Ash et al. |
| 6,002,511 A | 12/1999 | Varaprasad et al. |
| 6,207,292 B1 | 3/2001 | Berneth et al. |

OTHER PUBLICATIONS

Large-Area Electrochromic Coatings; Jang et al., J. Electrocham. Soc., vol. 143, No. 8, Aug. 1996; pp. 2591-2596.

*Primary Examiner*—Philip C. Tucker
(74) *Attorney, Agent, or Firm*—King & Partners, PLC

(57) ABSTRACT

An electrochromic medium for use in an electrochromic device comprising: at least one solvent; a cathodic electroactive material; an anodic electroactive material; wherein at least one of the cathodic and anodic electroactive materials is electrochromic; and a self-healing cross-linked polymer gel.

74 Claims, 1 Drawing Sheet

ELECTROCHROMIC MEDIUM HAVING A SELF-HEALING CROSS-LINKED POLYMER GEL AND ASSOCIATED ELECTROCHROMIC DEVICE

CROSS-REFERENCE TO RELATED APPLICATION(S)

This application is a continuation of U.S. application Ser. No. 09/940,944, filed Aug. 28, 2001, now U.S. Pat. No. 6,635,194 B2, which is hereby incorporated by reference in its entirety.

BACKGROUND OF THE INVENTION

1. Field of the Invention

The present invention relates in general to electrochromic devices, and more particularly, to an electrochromic medium, for use in an electrochromic device, which comprises a self-healing cross-linked polymer gel.

2. Background Art

Electrochromic devices have been known in the art for several years. While the utilization of electrochromic devices, such as electrochromic mirrors, has become increasingly popular, for example, among the automotive industry, the undesirable formation of visible irregularities and/or defects within the cross-linked polymer gel of electrochromic mediums, remains problematic.

Indeed, when many conventional electrochromic devices which utilize an electrochromic medium having a cross-linked polymer gel are exposed to a dynamic range of real world temperatures, the cross-linked polymer gel can become optically unacceptable for commercial use due to the formation of visual irregularities and/or defects.

Factors that are believed to facilitate the formation of the above-identified visible irregularities and/or defects include, among other things: (1) an insufficiently flexible polymer backbone; (2) an insufficient level of cohesive forces within the polymer network; and/or (3) an insufficient level of adhesive forces between the polymer network and the surface of an associated substrate and/or electrically conductive material.

It is therefore an object of the present invention to provide an electrochromic medium which comprises a self-healing cross-linked polymer gel which remedies the aforementioned detriments and/or complications associated with the use of conventional cross-linked polymer gels within an electrochromic device.

These and other objectives of the present invention will become apparent in light of the present specification, claims, and drawings.

SUMMARY OF THE INVENTION

The present invention is directed to an electrochromic medium for use in an electrochromic device comprising: (a) at least one solvent; (b) a cathodic electroactive material; (c) an anodic electroactive material; (d) wherein at least one of the cathodic and anodic electroactive materials is electrochromic; and (e) a self-healing cross-linked polymer gel.

The present invention is also directed to an electrochromic medium for use in an electrochromic device comprising: (a) at least one solvent; (b) a cathodic electroactive material; (c) an anodic electroactive material; (d) wherein at least one of the cathodic and anodic electroactive materials is electrochromic; (e) a cross-linked polymer gel; and (f) means associated with the cross-linked polymer gel for substantially diminishing undesirable visual irregularities and/or defects within the same.

In accordance with the present invention, an electrochromic device is disclosed which comprises: (a) at least one substantially transparent substrate having an electrically conductive material associated therewith; and (b) an electrochromic medium which comprises: (1) at least one solvent; (2) a cathodic electroactive material; (3) an anodic electroactive material; (4) wherein at least one of the cathodic and anodic electroactive materials is electrochromic; and (5) a self-healing cross-linked polymer gel.

The present invention is further directed to an electrochromic device comprising: (a) a first substantially transparent substrate having an electrically conductive material associated therewith; (b) a second substantially transparent substrate having an electrically conductive material associated therewith; and (c) an electrochromic medium contained within a chamber positioned between the first and second substrates which comprises: (1) at least one solvent; (2) a cathodic electroactive material; (3) an anodic electroactive material; (4) wherein at least one of the anodic and cathodic electroactive materials is electrochromic; and (5) a self-healing cross-linked polymer gel.

BRIEF DESCRIPTION OF THE DRAWINGS

The invention will now be described with reference to the drawings wherein.

DETAILED DESCRIPTION OF THE INVENTION

Figure 1:
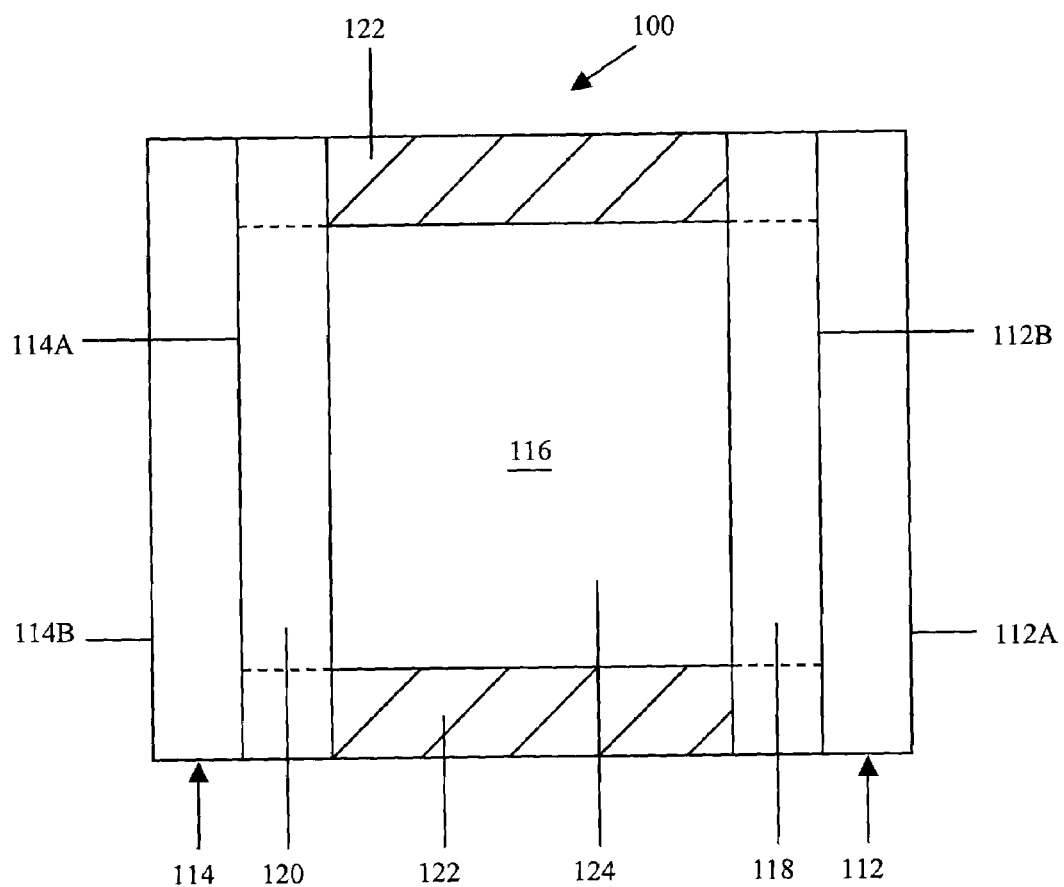
FIG. 1 of the drawings is a cross-sectional schematic representation of an electrochromic device fabricated in accordance with the present invention.

Referring now to the drawings and to FIG. 1 in particular, a cross-sectional schematic representation of electrochromic device 100 is shown, which generally comprises first substrate 112 having front surface 112A and rear surface 112B, second substrate 114 having front surface 114A and rear surface 114B, and chamber 116 for containing electrochromic medium 124. It will be understood that electrochromic device 100 may comprise, for illustrative purposes only, a mirror, a window, a display device, a contrast enhancement filter, and the like. It will be further understood that FIG. 1 is merely a schematic representation of electrochromic device 100. As such, some of the components have been distorted from their actual scale for pictorial clarity. Indeed, numerous other electrochromic device configurations are contemplated for use, including those disclosed in U.S. Pat. No. 5,818,625 entitled "Electrochromic Rearview Mirror Incorporating A Third Surface Metal Reflector" and U.S. application Ser. No. 09/343,345 entitled "Electrode Design For Electrochromic Devices," both of which are incorporated herein by reference in their entirety.

First substrate 112 may be fabricated from any one of a number of materials that are transparent or substantially transparent in the visible region of the electromagnetic spectrum, such as, for example, borosilicate glass, soda lime glass, float glass, natural and synthetic polymeric resins, plastics, and/or composites including Topas®, which is commercially available from Ticona of Summit, N.J. First substrate 112 is preferably fabricated from a sheet of glass having a thickness ranging from approximately 0.5 millimeters (mm) to approximately 12.7 mm. Of course, the thickness of the substrate will depend largely upon the
} particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties, such as strength to be able to operate effectively in conditions of intended use. Indeed, electrochromic devices in accordance with the present invention can be, during normal operation, exposed to extreme temperature variation as well as substantial UV radiation, emanating primarily from the sun.

Second substrate 114 may be fabricated from similar materials as that of first substrate 112. However, if the electrochromic device is a mirror, then the requisite of substantial transparency is not necessary. As such, second substrate 114 may, alternatively, comprise polymers, metals, glass, and ceramics—to name a few. Second substrate 114 is preferably fabricated from a sheet of glass having a thickness ranging from approximately 0.5 mm to approximately 12.7 mm. If first and second substrates 112 and 114, respectively, are fabricated from sheets of glass, then the glass can optionally be tempered, heat strengthened, and/or chemically strengthened, prior to or subsequent to being coated with layers of electrically conductive material (118 and 120).

One or more layers of electrically conductive material 118 are associated with rear surface 112B of first substrate 112. These layers serve as an electrode for the electrochromic device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electrochromic device or the atmosphere; and (e) exhibits minimal diffusion or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium/tin oxide (ITO), doped zinc oxide or other materials known to those having ordinary skill in the art.

Electrically conductive material 120 is preferably associated with front surface 114A of second substrate 114, and is operatively bonded to electrically conductive material 118 by sealing member 122. As can be seen in FIG. 1, once bonded, sealing member 122 and the juxtaposed portions of electrically conductive materials 118 and 120 serve to define an inner peripheral geometry of chamber 116.

Electronically conductive material 120 may vary depending upon the intended use of the electrochromic device. For example, if the electrochromic device is a mirror, then the material may comprise a transparent conductive coating similar to electronically conductive material 118 (in which case a reflector is associated with rear surface 114B of second substrate 114). Alternatively, electrically conductive material 120 may comprise a layer of reflective material in accordance with the teachings of previously referenced and incorporated U.S. Pat. No. 5,818,625. In this case, electrically conductive material 120 is associated with front surface 114A of second substrate 114. Typical coatings for this type of reflector include chromium, rhodium, ruthenium, silver, silver alloys, and combinations thereof.

Sealing member 122 may comprise any material that is capable of being adhesively bonded to the electronically conductive materials 118 and 120 to, in turn, seal chamber 116 so that electrochromic medium 124 does not inadvertently leak out of the chamber. As is shown in dashed lines in FIG. 1, it is also contemplated that the sealing member extend all the way to rear surface 112B and front surface 114A of their respective substrates. In such an embodiment, the layers of electrically conductive material 118 and 120 may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in U.S. Pat. Nos. 4,297,401; 4,418, 102; 4,695,490; 5,596,023; 5,596,024; 4,297,401; and 6,157,480, all of which are incorporated herein by reference in their entirety.

For purposes of the present disclosure, electrochromic medium 124 comprises at least one solvent, an anodic material, a cathodic material, and a cross-linked polymer gel. As will be shown in the experiments provided herein, the cross-linked polymer gels of the present invention are self-healing, and therefore enable electrochromic medium 124, and, in turn, electrochromic device 100 to operate in a wide range of temperatures without visual irregularities and/or defects within the electrochromic medium adversely affecting the device. It will be understood that regardless of its ordinary meaning, the term "self-healing" will be defined herein as the ability to substantially return to an initial state or condition prior to exposure to a dynamic thermal environment and/or the ability to resist the formation of visual irregularities and/or defects.

Typically both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

Electrochromic medium 124 is preferably chosen from one of the following categories:

(1) Single-layer, single-phase:—The electrochromic medium may comprise a single-layer of material which may include small non-homogenous regions and includes solution-phase devices where a material may be contained in solution in the ionically conducting electrolyte which remains in solution in the electrolyte when electrochemically oxidized or reduced. Solution phase electroactive materials may be contained in the continuous solution-phase of a gel medium in accordance with the teachings of U.S. Pat. No. 5,928,572 entitled "Electrochromic Layer And Devices Comprising Same" and International Patent Application Serial No. PCT/US98/05570 entitled "Electrochromic Polymeric Solid Films, Manufacturing Electrochromic Devices Using Such Solid Films, And Processes For Making Such Solid Films And Devices," both of which are incorporated herein by reference in their entirety.

More than one anodic and cathodic material can be combined to give a preselected color as described in U.S. Pat. No. 6,020,987 entitled "Improved Electrochromic Medium Capable of Producing A Pre-Selected Color," which is incorporated herein by reference in its entirety.

The anodic and cathodic materials can be combined or linked by a bridging unit as described in International Application Serial No. PCT/WO97/30134 entitled "Electrochromic System," which is incorporated herein by reference in its entirety.

It is also possible to link anodic materials or cathodic materials by similar methods. The concepts described in these applications/patents can further be combined to yield a variety of electroactive materials that are linked, including linking of a redox buffer to an anodic and/or cathodic material.

Additionally, a single-layer, single-phase medium may include a medium where the anodic and cathodic materials are incorporated into a polymer matrix as is described in International Application Serial No. PCT/WO99/02621 entitled "Electrochromic Polymer System" and International Patent Application Serial No. PCT/US98/05570 entitled "Electrochromic Polymeric Solid Films, Manufacturing Electrochromic Devices Using Such Solid Films, And Processes For Making Such Solid Films And Devices."

(2) Multi-layer—the medium may be made up in layers and includes a material attached directly to an electronically conducting electrode or confined in close proximity thereto which remains attached or confined when electrochemically oxidized or reduced. Examples of this type of electrochromic medium include a $WO_3$/ionically conducting layer/counter layer electrochromic medium. An organic or organometallic layer attached to the electrode may also be included in this type of medium.

(3) Multi-phase—one or more materials in the medium undergoes a change in phase during the operation of the device, for example a material contained in solution in the ionically conducting electrolyte forms a layer on the electronically conducting electrode when electrochemically oxidized or reduced.

The cathodic material may include, for example, viologens, such as methyl viologen tetrafluoroborate, octyl viologen tetrafluoroborate, or 1,1',3,3'-tetramethyl-4,4'-bipyridinium tetrafluoroborate. It will be understood that the preparation and/or commercial availability for each of the above-identified cathodic materials is well known in the art. While specific cathodic materials have been provided, for illustrative purposes only, numerous other conventional cathodic materials are likewise contemplated for use including, but by no means limited to, those disclosed in U.S. Pat. No. 4,902,108, which is hereby incorporated in its entirety by reference. Indeed, the only contemplated limitation relative to the cathodic material is that it should not adversely affect the electrochromic performance of the device 100. Moreover, it is contemplated that the cathodic material may comprise a polymer film, such as polythiophenes, an inorganic film, such as Prussian Blue, or a solid transition metal oxide, including, but not limited to, tungsten oxide.

The anodic material may comprise any one of a number of materials including ferrocene, substituted ferrocenes, substituted ferrocenyl salts, substituted phenazines, phenothiazine, substituted phenothiazines, thianthrene, substituted thianthrenes. Examples of anodic materials may include di-tert-butyl-diethylferrocene, (6-(tetra-tert-butylferrocenyl)hexyl)triethylammonium tetrafluoroborate, (3-(tetra-tert-butylferrocenyl)propyl)triethylammonium tetrafluoroborate, 5,10-dihydro-5,10-dimethylphenazine, 3,7,10-trimethylphenothiazine, 2,3,7,8-tetramethoxythianthrene, and 10-methylphenothiazine. It is also contemplated that the anodic material may comprise a polymer film, such as polyaniline, polythiophenes, polymeric metallocenes, or a solid transition metal oxide, including, but not limited to, oxides of vanadium, nickel, iridium, as well as numerous heterocyclic compounds, etcetera. It will be understood that numerous other anodic materials are contemplated for use including those disclosed in the previously referenced and incorporated '108 patent, as well as U.S. Pat. No. 6,188,505 B1 entitled "Color-Stabilized Electrochromic Devices," which is incorporated herein by reference in its entirety.

For illustrative purposes only, the concentration of the anodic and cathodic materials can range from approximately 1 mM to approximately 500 mM and more preferably from approximately 5 mM to approximately 50 mM. While particular concentrations of the anodic as well as cathodic materials have been provided, it will be understood that the desired concentration may vary greatly depending upon the geometric configuration of the chamber containing electrochromic medium 124.

For purposes of the present disclosure, the solvent of electrochromic medium 124 may comprise any one of a number of common, commercially available solvents including 3-methylsulfolane, glutaronitrile, dimethyl sulfoxide, dimethyl formamide, acetonitrile, tetraglyme and other polyethers, alcohols such as ethoxyethanol, nitriles, such as 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same. While specific solvents have been disclosed as being associated with the electrochromic medium, numerous other solvents or plasticizers that would be known to those having ordinary skill in the art having the present disclosure before them are likewise contemplated for use.

In accordance with the present invention, electrochromic medium 124 comprises a cross-linked polymer gel. The cross-linked polymer gel includes a backbone which may be selected from, for example, polyamides, polyimides, polycarbonates, polyesters, polyethers, polymethacrylates, polyacrylates, polysilanes, polysiloxanes, polyvinylacetates, polymethacrylonitriles, polyacrylonitriles, polyvinylphenols, polyvinylalcohols, polyvinylidenehalides, and co-polymers and combinations thereof.

For purposes of the present disclosure, cohesive functional groups are associated with and/or incorporated into the polymer backbone, and may include a hydroxyl group, acetates, thiols, amines, amides, carboxylic acids, carboxylates, phosphonates, sulfonyl halides, silicate esters, ammonium salts, sulfonyl acids, siloxyls, silyls, cyanos, and combinations thereof. Unlike conventional cross-linked polymer gels used in electrochromic devices, the cross-linked polymer gels of the present invention include one or more of the above-identified cohesive functional groups which are present in an effective concentration to substantially diminish and/or eliminate visual irregularities and/or defects within the electrochromic medium. It will be understood that the term "cohesive" will be defined herein, regardless of its ordinary meaning, as attractive forces within a polymer network itself, attractive forces between a polymer network and the surface of an associated substrate and/or electrically conductive material, and/or attractive forces between a cross-linked polymer backbone and an associated solvent within a polymer network (i.e. salvation).

Without being bound to any particular theory, it is believed that the cohesive functional groups substantially facilitate attractive forces, such as, but not limited to, dipole-dipole interactions or hydrogen-bonding, which enable the polymer molecules to flexibly reassociate with each other even after thermal contraction and/or expansion of the polymer gel.

In accordance with the present invention, the above-identified polymer backbones are cross-linked with a cross-linking reactant having a cross-linking functional group, such as an isocyanate. While an isocyanate has been disclosed, for illustrative purposes only, as a cross-linking functional group, it will be understood that any one of a number of other cross-linking functional groups that would be known to those with ordinary skill in the art having the present disclosure before them are likewise contemplated for use—with the only limitation being that for the cross-linked polymer gel to be self-healing, a cohesive functional group must be present in an effective concentration to substantially diminish and/or eliminate visual irregularities and/or defects within the electrochromic medium. However, as will be shown in the experiments provided herein below, the molar ratio of the cohesive functional group on the polymer backbone to the cross-linking functional group (as measured by reactant concentration) is preferably greater than approximately 3:1, and more preferably between approximately 3:1 and approximately 100:1. As will be shown in the experiments provided herein below, when the cross-linked polymer gel comprises an effective concentration of cohesive functional groups relative to cross-linking functional groups, the gel exhibits remarkable self-healing characteristics unseen heretofore.

In addition, electrochromic medium 124 may comprise other materials, such as light absorbers, light stabilizers, thermal stabilizers, antioxidants, tint providing agents, and mixtures thereof. Suitable UV-stabilizers may include: the material ethyl-2-cyano-3,3-diphenyl acrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material 2,4-dihydroxybenzophenone sold by, among many others, Aldrich Chemical Co.; the material 2-hydroxy-4-methoxybenzophenone sold by American Cyanamid under the trademark Cyasorb UV 9; and the material 2-ethyl-2'-ethoxyalanilide sold by Sandoz Color & Chemicals under the trademark Sanduvor VSU—to name a few.

Electrochromic devices having as a component part an electrochromic medium comprising one or more current-reducing additives can be used in a wide variety of applications wherein the transmitted or reflected light can be modulated. Such devices include rear-view mirrors for vehicles; windows for the exterior of a building, home or vehicle; skylights for buildings including tubular light filters; windows in office or room partitions; display devices; contrast enhancement filters for displays; light filters for photographic devices and light sensors; and indicators for power cells as well as primary and secondary electrochemical cells.

In support of the present invention, several experiments were conducted wherein electrochromic devices were prepared and subsequently tested for, among other things, visual irregularities under highly dynamic thermal conditions. In particular, each one of the electrochromic devices included a first (2.5"×10") substrate coated with generally clear, conductive indium/tin oxide (ITO) on the rear surface (112B), and a second (2.5"×10") substrate coated with a conventional conductive metal reflector on the front surface (114A), with the exception that the devices of Experiment No. 2 were coated with fluorine-doped tin oxide on surfaces 112B, 114A and a metal reflector was associated with surface 114B. The two substrates were spaced 137 microns apart for accommodating the medium. In each experiment the electrochromic devices were placed in an oven that was pre-heated to approximately 85° C. The devices were then left in the oven for between approximately 16 and approximately 64 hours. Next, the electrochromic devices were removed from the oven, visually inspected, and immediately placed into a freezer having a temperature set point of approximately −40° C. The electrochromic devices remained in the freezer for between approximately 6 and approximately 8 hours. Each of the devices were then inspected for visual irregularities, and immediately placed back into the above-identified, pre-heated oven for a second cycle. The electrochromic devices of the present invention were each thermally cycled 14 times—with the last cycle concluding with a warm up to ambient temperature for approximately 14 hours. After warming to ambient temperature, the devices were inspected for, among other things, visual irregularities and/or defects. The above-identified procedure and derivatives thereof may be referred to as thermal shock testing. It will be understood that the term "cycle" will be herein defined relative to the experimental procedure as exposure from hot to cold or vice versa.

Experiment No. 1

In this experiment an electrochromic polyacrylate gel was prepared, wherein a considerable excess of hydroxyl groups were present in the gel. The molar ratio of hydroxyl groups to isocyanate groups for this experiment was approximately 13:1.

The stock polyacrylate resin was made in the following manner: 71.7 g (0.833 mol) of methylacrylate, 24.2 g (0.208 mol) of 2-hydroxyethylacrylate, 0.627 g of a thermal initiator (V-601) (dimethyl 2,2'-azobis(2-methypropionate), Wako Chemicals USA, Inc., Richmond, Va., U.S.A.), and 624 g of PC were charged to a three-neck round bottom flask which was heated to 70° C. with agitation under a nitrogen atmosphere for ca. 20 h. Next, 0.235 g of initiator, V-601, was added to the solution and the flask was heated to ca. 150° C. for 1 h. with agitation under a nitrogen atmosphere.

The polymer gel of experiment No. 1 was prepared by the following two-solution technique. A first solution was prepared by mixing 0.6892 g of a 5% (by weight) solution of Tolonate HDT (an aliphatic polyisocyanate, 22.15% isocyanate by wt., CN 7500, Rhodia Inc., of Cranbury, N.J.) in propylene carbonate (PC), and 0.665 g of 1,1'-dioctyl-4,4'-dipyridinium tetrafluroborate. The second solution was prepared by mixing 24.2 g of PC, 0.181 g of 5,10-dihydro-5,10-dimethylphenazine, 3.49 g of Viosorb 910, and 8.180 g of a 13.3% stock solution of a 4:1 poly(methylacrylate-co-2-hydroxyethylacrylate) in PC. The two solutions were mixed together with 0.0444 g of a 1% solution of dibutyltin diacetate in PC and backfilled into eight electrochromic devices. The devices were baked in a 60° C. oven overnight (ca. 16 h) to gel the electrochromic material. One device was split open to verify gellation. The total concentration of copolymer and HDT in the electrochromic gel was approximately 3%. Thermal shock testing was performed on six devices.

Thermal shock observations of these electrochromic devices were as follows: (1) more than half of the devices showed signs of either bubbles and/or irregularities after being placed in the −40° C. freezer during most of the thermal shock cycles; and (2) all of the devices healed completely, with no visible signs of defects in the electrochromic material after the devices had completed all of the thermal shock cycles and had been allowed to warm to room temperature.

Experiment No. 2

In this experiment an electrochromic polyacrylate gel was prepared, wherein a moderate excess of hydroxyl groups were present in the gel. The molar ratio of hydroxyl groups to isocyanate groups for this experiment was approximately 4:1.

The polymer gel of experiment No. 2 was prepared by the following two-solution technique. A first solution was prepared by mixing 2.278 g of a 5% (by weight) solution of Tolonate HDT in PC and 0.615 g of 1,1'-dioctyl-4,4'-dipyridinium tetrafluroborate. The second solution was prepared by mixing 18.95 g of PC, 0.195 g of 5,10-dihydro-5,10-dimethylphenazine, 2.87 g of Viosorb 910, and 16.11 g of a 14.6% stock solution of a 10:1 poly(methylacrylate-co-2-hydroxyethylacrylate) in PC. The two solutions were mixed together with 0.0296 g of a 10% solution of dibutyltin diacetate in PC and backfilled into six electrochromic devices. The devices were baked in an 80° C. oven overnight (ca. 16 h) to gel the electrochromic material. One device was split open to verify gellation. The total concentration of copolymer and HDT in the electrochromic gel was approximately 6%.

Thermal shock observations of these electrochromic devices were as follows: (1) of the six parts tested, one showed no signs of any irregularities and/or bubbles during any of the thermal shock cycles; (2) of the other seven devices, one device had one occurrence, one had three occurrences, and three devices had occurrences on most cycles of either irregularities and/or bubbles; and (3) all of the devices healed completely upon completion of the test, except one device which had a small residual bubble after 17 hours.

Experiment No. 3

In this experiment an electrochromic polyacrylate gel was prepared, wherein only a slight excess of hydroxyl groups were present in the gel. The molar ratio of hydroxyl groups to isocyanate groups for this experiment was approximately 1.1:1.

The polymer gel of experiment No. 3 was prepared by the following two-solution technique. A first solution was prepared by mixing 36.61 g of propylene carbonate (PC), 0.774 g of bisphenol A (the hydroxyl cross-linker), 5.12 g of Viosorb 910, and 0.260 g of 5,10-dihydro-5,10-dimethylphenazine. The second solution was prepared by mixing 0.978 g of 1,1'-dioctyl-4,4'-dipyridinium tetrafluroborate and 11.95 g of a 18.4% solution of a poly(methylacrylate-co-2-isocyanoethylmethacrylate) in PC. The ratio of methylacrylate to 2-isocyanoethylmethacrylate in the copolymer resin was 40 to 1. The two solutions were mixed together, backfilled into nine electrochromic devices, and exposed to ambient temperature overnight. The electrochromic devices were gelled by the next day. Thermal shock testing was performed on seven devices.

Thermal shock observations of these electrochromic devices were as follows: (1) signs of bubbles and/or irregularities were observed in all of the devices after being placed into the −40° C. freezer during earlier cycles; and (2) after allowing these devices to warm to room temperature at the end of the last cycle, all of them had signs of irregularities and/or defects that looked like small wrinkles. The defects were visually intensified upon coloring and clearing for each of these devices.

Experiment No. 4

In this experiment an electrochromic polyacrylate gel was prepared, wherein a slight excess of hydroxyl groups were present in the gel. The molar ratio of hydroxyl groups to isocyanate groups for this experiment was approximately 1.15:1.

The polymer gel of experiment No. 4 was prepared by the following two-solution technique. A first solution was prepared by mixing 11.13 g of a 18.42% 1:40 poly(2-isocyanoethylmethacrylate-co-methylacrylate) solution in PC with 0.837 g of 1,1'-dioctyl-4,4'-dipyridinium tetrafluoroborate. The second solution was prepared by mixing 30.34 g of PC, 0.222 g of 5,10-dihydro-5,10-dimethylphenazine, 4.43 g of Viosorb 910, and 0.326 g of poly(ethylene glycol), MW=1000 g/mol (Aldrich). The two solutions were mixed together with 0.0451 g of a 1% solution of dibutyltin diacetate in PC and backfilled into eight electrochromic devices. The devices were baked in a 60° C. oven overnight (ca. 16 h) to gel the electrochromic material. One device was split open to verify gellation. The total concentration of polymer in the gel was approximately 5%. Thermal shock testing was performed on six devices.

Thermal shock observations of the six electrochromic devices tested were as follows: (1) signs of bubbles and/or irregularities were observed in half of the devices after being placed into the −40° C. freezer during approximately seven of the cycles; and (2) after allowing these devices to warm to room temperature at the end of the last cycle, all of them had signs of irregularities and/or defects that looked like small wrinkles.

Experiment No. 5

In this experiment an electrochromic polyacrylate-polyether gel was prepared, wherein an excess of hydroxyl groups were present in the gel. The molar ratio of hydroxyl groups to isocyanate groups for this experiment was approximately 10:1.

The polymer gel was prepared by the following two-solution technique. The first solution was prepared by mixing 1.54 g of a 5% (by weight) solution of Tolonate HDT in PC and 0.819 g of 1,1'-dioctyl-4,4'-dipyridinium tetrafluroborate. The second solution was prepared be mixing 21.3 g PC, 0.219 g 5,10-dihydro-5,10-dimethylphenazine, 4.29 g Viosorb 109, and 18.0 g of a 18.4% solution of a terpolymer polyol in PC. The terpolymer polyol was synthesized from methylacrylate, 2-hydroxylethylacylate, and poly(ethylene glycol) monomethyl ether monomethacrylate (molecular weight ca. 1000 g/mol, Aldrich) via a thermal initiated radical polymerization with molar ratios of 18, 6 and 1 respectively. The two solutions were mixed together and backfilled into eight electrochromic devices. The devices were allowed to gel over the next four days at ambient temperature. One part was split open to ensure gellation had occurred. Thermal shock testing was done on six devices.

Thermal shock observations of these electrochromic devices were as follows: Most of the devices exhibited signs of bubbles and/or irregularities on most of the cycles. All the devices healed completely upon completion of the test, except one device had small pin size dots near the side of the device where it had been filled.

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed is:

1. An electrochromic medium for use in an electrochromic device, comprising:
    at least one solvent;
    a cathodic electroactive material;
    an anodic electroactive material;
    wherein at least one of the cathodic and anodic electroactive materials is electrochromic; and
    a self-healing cross-linked polymer gel.

2. The electrochromic medium according to claim 1, wherein the self-healing cross-linked polymer gel comprises at least one cohesive functional group present in an effective concentration to, in turn, substantially diminish visual irregularities within the same.

3. The electrochromic medium according to claim 2, wherein the at least one cohesive functional group is selected from the group comprising a hydroxyl group, acetates, thiols, amines, amides, carboxylic acids, carboxylates, phosphonates, sulfonyl halides, silicate esters, ammonium salts, sulfonyl acids, siloxyls, silyls, cyanos, and combinations thereof.

4. The electrochromic medium according to claim 3, wherein the at least one cohesive functional group consists of a hydroxyl group.

5. The electrochromic medium according to claim 2, wherein the self-healing cross-linked polymer gel includes a product of a cross-linking reactant, wherein the cross-linking reactant comprises an isocyanate.

6. The electrochromic medium according to claim 1, wherein the self-healing cross-linked polymer gel includes a backbone selected from the group comprising polyamides, polyimides, polycarbonates, polyesters, polyethers, polymethacrylates, polyacrylates, polysilanes, polysiloxanes, polyvinylacetates, polymethacrylonitriles, polyacrylonitriles, polyvinylphenols, polyvinylalcohols, polyvinylidenehalides, and co-polymers and combinations thereof.

7. The electrochromic medium according to claim 1, wherein the cathodic and anodic electroactive materials are linked.

8. The electrochromic medium according to claim 1, wherein the at least one solvent is selected from the group comprising 3-methylsulfolane, sulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same.

9. The electrochromic medium according to claim 1, wherein the concentration of at least one of the cathodic and anodic electrochromic materials ranges from approximately 1 mM to approximately 1000 mM.

10. The electrochromic medium according to claim 1, wherein the concentration of at least one of the cathodic and anodic electrochromic materials ranges from approximately 5 mM to approximately 500 mM.

11. The electrochromic medium according to claim 1, wherein the cathodic electroactive material comprises a viologen.

12. The electrochromic medium according to claim 1, wherein the cathodic electroactive material comprises a polymer film.

13. The electrochromic medium according to claim 1, wherein the cathodic electroactive material comprises tungsten oxide.

14. The electrochromic medium according to claim 1, wherein the anodic electroactive material comprises a heterocyclic compound.

15. The electrochromic medium according to claim 1, wherein the anodic electroactive material comprises a polymer film.

16. The electrochromic medium according to claim 1, wherein the anodic electroactive material is selected from the group consisting 5,10-dihydro-5,10-dimethylphenazine, 10-methylphenothiazine, a metallocene, and mixtures thereof.

17. An electrochromic medium for use in an electrochromic device, comprising:
    at least one solvent;
    a cathodic electroactive material;
    an anodic electroactive material;
    wherein at least one of the cathodic and anodic electroactive materials is electrochromic;
    a cross-linked polymer gel; and
    self-healing means associated with the cross-linked polymer gel for substantially diminishing undesirable visual irregularities within the same.

18. The electrochromic medium according to claim 17, wherein the cross-linked polymer gel comprises at least one cohesive functional group present in an effective concentration to, in turn, substantially diminish visual irregularities within the same.

19. The electrochromic medium according to claim 18, wherein the at least one cohesive functional group is selected from the group comprising a hydroxyl group, acetates, thiols, amines, amides, carboxylic acids, carboxylates, phosphonates, sulfonyl halides, silicate esters, ammonium salts, sulfonyl acids, siloxyls, silyls, cyanos, and combinations thereof.

20. The electrochromic medium according to claim 19, wherein the at least one cohesive functional group consists of a hydroxyl group.

21. The electrochromic medium according to claim 18, wherein the cross-linked polymer gel includes a product of a cross-linking reactant, wherein the cross-linking reactant comprises an isocyanate.

22. The electrochromic medium according to claim 17, wherein the cross-linked polymer gel includes a backbone selected from the group comprising polyamides, polyimides, polycarbonates, polyesters, polyethers, polymethacrylates, polyacrylates, polysilanes, polysiloxanes, polyvinylacetates, polymethacrylonitriles, polyacrylonitriles, polyvinylphenols, polyvinylalcohols, polyvinylidenehalides, and co-polymers and combinations thereof.

23. The electrochromic medium according to claim 17, wherein the cathodic and anodic electroactive materials are linked.

24. The electrochromic medium according to claim 17, wherein the at least one solvent is selected from the group comprising 3-methylsulfolane, sulfolane, glutaronitrile, dimethyl sulfoxide, dimethyl formamide, acetonitrile, polyethers including tetraglyme, alcohols including ethoxyethanol, nitrites including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same.

25. The electrochromic medium according to claim 17, wherein the concentration of at least one of the cathodic and anodic electrochromic materials ranges from approximately 1 mM to approximately 1000 mM.

26. The electrochromic medium according to claim 17, wherein the concentration of at least one of the cathodic and anodic electrochromic materials ranges from approximately 5 mM to approximately 500 mM.

27. The electrochromic medium according to claim 17, wherein the cathodic electroactive material comprises a viologen.

28. The electrochromic medium according to claim 17, wherein the cathodic electroactive material comprises a polymer film.

29. The electrochromic medium according to claim 17, wherein the cathodic electroactive material comprises tungsten oxide.

30. The electrochromic medium according to claim 17, wherein the anodic electroactive material comprises a heterocyclic compound.

31. The electrochromic medium according to claim 17, wherein the anodic electroactive material comprises a polymer film.

32. The electrochromic medium according to claim 17, wherein the anodic electroactive material is selected from at least one of the group comprising 5,10-dihydro-5,10-dimethylphenazine, 10-methylphenothiazine, a metallocene, and mixtures thereof.

33. An electrochromic device, comprising:
at least one substantially transparent substrate having an electrically conductive material associated therewith; and
an electrochromic medium which comprises:
at least one solvent;
a cathodic electroactive material;
an anodic electroactive material;
wherein at least one of the cathodic and anodic electroactive materials is electrochromic; and
a self-healing cross-linked polymeric gel.

34. The electrochromic device according to claim 33, wherein the self-healing cross-linked polymer gel comprises at least one cohesive functional group present in an effective concentration to, in turn, substantially diminish visual irregularities within the same.

35. The electrochromic device according to claim 34, wherein the at least one cohesive functional group is selected from the group comprising a hydroxyl group, acetates, thiols, amines, amides, carboxylic acids, carboxylates, phosphonates, sulfonyl halides, silicate esters, ammonium salts, sulfonyl acids, siloxyls, silyls, cyanos, and combinations thereof.

36. The electrochromic device according to claim 35, wherein the at least one cohesive functional group consists of a hydroxyl group.

37. The electrochromic device according to claim 34, wherein the self-healing cross-linked polymer gel includes a product of a cross-linking reactant, wherein the cross-linking reactant comprises an isocyanate.

38. The electrochromic device according to claim 33, wherein the self-healing cross-linked polymer gel includes a backbone selected from the group comprising polyamides, polyimides, polycarbonates, polyesters, polyethers, polymethacrylates, polyacrylates, polysilanes, polysiloxanes, polyvinylacetates, polymethacrylonitriles, polyacrylonitriles, polyvinylphenols, polyvinylalcohols, polyvinylidenehalides, and co-polymers and combinations thereof.

39. The electrochromic device according to claim 33, wherein the cathodic and anodic electroactive materials are linked.

40. The electrochromic device according to claim 33, wherein the at least one solvent is selected from the group comprising 3-methylsulfolane, sulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same.

41. The electrochromic device according to claim 33, wherein the concentration of at least one of the cathodic and anodic electrochromic materials ranges from approximately 1 mM to approximately 1000 mM.

42. The electrochromic device according to claim 33, wherein the concentration of at least one of the cathodic and anodic electrochromic materials ranges from approximately 5 mM to approximately 500 mM.

43. The electrochromic device according to claim 33, wherein the cathodic electroactive material comprises a viologen.

44. The electrochromic device according to claim 33, wherein the cathodic electroactive material comprises a polymer film.

45. The electrochromic device according to claim 33, wherein the cathodic electroactive material comprises tungsten oxide.

46. The electrochromic device according to claim 33, wherein the anodic electroactive material comprises a heterocyclic compound.

47. The electrochromic device according to claim 33, wherein the anodic electroactive material comprises a polymer film.

48. The electrochromic device according to claim 33, wherein the anodic electroactive material is selected from at least one of the group comprising 5,10-dihydro-5,10-dimethylphenazine, 10-methylphenothiazine, a metallocene, and mixtures thereof.

49. The electrochromic device according to claim 33, comprising a first substantially transparent substrate and a second substrate.

50. The electrochromic device according to claim 49, wherein the device is an electrochromic window.

51. The electrochromic device according to claim 49, wherein the second substrate is plated with a reflective material.

52. The electrochromic device according to claim 51, wherein the reflective material is selected from the group comprising chromium, ruthenium, rhodium, silver, alloys of the same, and stacked layers thereof.

53. The electrochromic device according to claim 52, wherein the device is an electrochromic mirror.

54. An electrochromic device, comprising:
a first substantially transparent substrate having an electrically conductive material associated therewith;
a second substantially transparent substrate having an electrically conductive material associated therewith; and an electrochromic medium contained within a chamber positioned between the first and second substrates which comprises:
   at least one solvent;
   a cathodic electroactive material;
   an anodic electroactive material, wherein at least one of the anodic and cathodic electroactive materials is electrochromic; and
   a self-healing cross-linked polymeric gel.

55. The electrochromic device according to claim 54, wherein the self-healing cross-linked polymer gel comprises at least one cohesive functional group present in an effective concentration to, in turn, substantially diminish visual irregularities within the same.

56. The electrochromic device according to claim 55, wherein the at least one cohesive functional group is selected from the group comprising a hydroxyl group, acetates, thiols, amines, amides, carboxylic acids, carboxylates, phosphonates, sulfonyl halides, silicate esters, ammonium salts, sulfonyl acids, siloxyls, silyls, cyanos, and combinations thereof.

57. The electrochromic device according to claim 56, wherein the at least one cohesive functional group consists of a hydroxyl group.

58. The electrochromic device according to claim 55, wherein the self-healing cross-linked polymer gel includes a product of a cross-linking reactant, wherein the cross-linking reactant comprises an isocyanate.

59. The electrochromic device according to claim 54, wherein the self-healing cross-linked polymer gel includes a backbone selected from the group comprising polyamides, polyimides, polycarbonates, polyesters, polyethers, polymethacrylates, polyacrylates, polysilanes, polysiloxanes, polyvinylacetates, polymethacrylonitriles, polyacrylonitriles, polyvinylphenols, polyvinylalcohols, polyvinylidenehalides, and co-polymers and combinations thereof.

60. The electrochromic device according to claim 54, wherein the cathodic and anodic electroactive materials are linked.

61. The electrochromic device according to claim 54, wherein the at least one solvent is selected from the group comprising 3-methylsulfolane, sulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same.

62. The electrochromic device according to claim 54, wherein the concentration of at least one of the cathodic and anodic electrochromic materials ranges from approximately 1 mM to approximately 1000 mM.

63. The electrochromic device according to claim 54, wherein the concentration of at least one of the cathodic and anodic electrochromic materials ranges from approximately 5 mM to approximately 500 mM.

64. The electrochromic device according to claim 54, wherein the cathodic electroactive material comprises a viologen.

65. The electrochromic device according to claim 54, wherein the cathodic electroactive material comprises a polymer film.

66. The electrochromic device according to claim 54, wherein the cathodic electroactive material comprises tungsten oxide.

67. The electrochromic device according to claim 54, wherein the anodic electroactive material comprises a heterocyclic compound.

68. The electrochromic device according to claim 54, wherein the anodic electroactive material comprises a polymer film.

69. The electrochromic device according to claim 54, wherein the anodic electroactive material is selected from at least one of the group comprising 5,10-dihydro-5,10-dimethylphenazine, 10-methylphenothiazine, a metallocene, and mixtures thereof.

70. The electrochromic device according to claim 54, comprising a first substantially transparent substrate and a second substrate.

71. The electrochromic device according to claim 70, wherein the device is an electrochromic window.

72. The electrochromic device according to claim 70, wherein the second substrate is plated with a reflective material.

73. The electrochromic device according to claim 72, wherein the reflective material is selected from the group comprising chromium, ruthenium, rhodium, silver, alloys of the same, and stacked layers thereof.

74. The electrochromic device according to claim 73, wherein the device is an electrochromic mirror.

* * * * *

UNITED STATES PATENT AND TRADEMARK OFFICE
CERTIFICATE OF CORRECTION

PATENT NO. : 7,001,540 B2
APPLICATION NO. : 10/662665
DATED : February 21, 2006
INVENTOR(S) : Kloeppner et al.

It is certified that error appears in the above-identified patent and that said Letters Patent is hereby corrected as shown below:

On the title page, item [56]:
    Page 1, under OTHER PUBLICATIONS, delete "J. Electrocham. Soc.," and substitute --J. Electrochem. Soc.,--.

Column 6, line 60, delete "(i.e. salvation)" and substitute --(i.e. solvation)--.

In Claim 3, column 11, line 26, delete "comprising" and substitute --consisting of--.

In Claim 6, column 11, line 40, delete "comprising" and substitute --consisting of--.

In Claim 16, column 12, line 18, delete "consisting" and substitute --consisting of--.

In Claim 19, column 12, line 39, delete "comprising" and substitute --consisting of--.

In Claim 22, column 12, line 53, delete "comprising" and substitute --consisting of--.

In Claim 24, column 12, line 64, delete "comprising" and substitute --consisting of--.

In Claim 24, column 12, line 67, delete "nitrites" and substitute --nitriles--.

In Claim 32, column 13, line 31, delete "comprising" and substitute --consisting of--.

In Claim 35, column 13, line 52, delete "comprising" and substitute --consisting of--.

In Claim 38, column 13, line 66, delete "comprising" and substitute --consisting of--.

In Claim 40, column 14, line 10, delete "comprising" and substitute --consisting of--.

In Claim 48, column 14, line 45, delete "comprising" and substitute --consisting of--.

In Claim 52, column 14, line 58, delete "comprising" and substitute --consisting of--.

UNITED STATES PATENT AND TRADEMARK OFFICE
CERTIFICATE OF CORRECTION

PATENT NO. : 7,001,540 B2
APPLICATION NO. : 10/662665
DATED : February 21, 2006
INVENTOR(S) : Kloeppner et al.

It is certified that error appears in the above-identified patent and that said Letters Patent is hereby corrected as shown below:

In Claim 56, column 15, line 17, delete "comprising" and substitute --consisting of--.

In Claim 59, column 15, line 31, delete "comprising" and substitute --consisting of--.

In Claim 61, column 15, line 42, delete "comprising" and substitute --consisting of--.

In Claim 69, column 16, line 29, delete "comprising" and substitute --consisting of--.

In Claim 73, column 16, line 42, delete "comprising" and substitute --consisting of--.

Signed and Sealed this

First Day of August, 2006

JON W. DUDAS
*Director of the United States Patent and Trademark Office*